(12) United States Patent
Ohira et al.

(10) Patent No.: US 9,574,611 B2
(45) Date of Patent: Feb. 21, 2017

(54) ROLLER BEARING HAVING SENSOR, MOTOR, AND ACTUATOR

(71) Applicant: NSK LTD., Shinagawa-ku, Tokyo (JP)

(72) Inventors: Kazuhiro Ohira, Kanagawa (JP); Katsuaki Denpou, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/888,352

(22) PCT Filed: Dec. 11, 2013

(86) PCT No.: PCT/JP2013/007298
§ 371 (c)(1),
(2) Date: Oct. 30, 2015

(87) PCT Pub. No.: WO2014/188473
PCT Pub. Date: Nov. 27, 2014

(65) Prior Publication Data
US 2016/0061268 A1    Mar. 3, 2016

(30) Foreign Application Priority Data
May 20, 2013 (JP) .................. 2013-106089

(51) Int. Cl.
*F16C 33/80* (2006.01)
*F16C 41/00* (2006.01)
(Continued)

(52) U.S. Cl.
CPC ............ *F16C 41/007* (2013.01); *F16C 19/06* (2013.01); *F16C 33/78* (2013.01); *F16C 33/7856* (2013.01)

(58) Field of Classification Search
CPC ..... F16C 33/7856; F16C 33/80; F16C 33/805; F16C 41/007
(Continued)

(56) References Cited

U.S. PATENT DOCUMENTS 7,249,891 B2 * 7/2007 Aoki ..................... F16C 33/586
384/448
2002/0030482 A1 * 3/2002 Iwamoto ................. G01P 3/443
324/174
(Continued)

FOREIGN PATENT DOCUMENTS

JP    EP 1291660 A2 *   3/2003 ........... G01D 5/2451
JP    2007-192301 A      8/2007
(Continued)

OTHER PUBLICATIONS

International Preliminary Report on Patentability (PCT/IB/338 & PCT/IB/373) issued in PCT Application No. PCT/JP2013/007298 dated Dec. 3, 2015, including English-language translation of document C2 (Japanese-language Written Opinion (PCT/ISA/237)) previously filed on Oct. 30, 2015 (six (6) pages).
(Continued)

*Primary Examiner* — Phillip A Johnson
(74) *Attorney, Agent, or Firm* — Crowell & Moring LLP

(57) ABSTRACT

A sensor (20) arranged in a deep groove ball bearing (10) includes an encoder (22) attached at an inner ring (1) to be rotatable integrally with the inner ring (1), and a magnetism detecting element (24) attached at an outer ring (2) via a sensor housing (26) to face the encoder (22) with a sensor gap. Then, the magnetism detecting element (24) is capable of measuring a rotating state of the encoder (22) rotating in the rotating state identical to that of the inner ring (1) in conjunction with a rotation of the inner ring (1). The deep groove ball bearing (10) includes a foreign material entering prevention portion that prevents a foreign material from entering the inside of the bearing from a gap between the inner ring (1) and the sensor housing (26). The size of the gap between the inner ring (1) and the sensor housing (26) is substantially identical to the sensor gap between the magnetism detecting element (24) and the encoder (22), and
(Continued)

the gap configures non-contact seal and functions as the foreign material entering prevention portion.

5 Claims, 2 Drawing Sheets

(51) Int. Cl.
  *F16C 33/78* (2006.01)
  *F16C 19/06* (2006.01)
(58) Field of Classification Search
  USPC ........................................................ 384/448
  See application file for complete search history.

(56) References Cited

U.S. PATENT DOCUMENTS

| | | | |
|---|---|---|---|
| 2005/0031239 A1* | 2/2005 | Aoki | F16C 33/76 384/448 |
| 2005/0201648 A1* | 9/2005 | Takada | F16C 41/007 384/448 |
| 2006/0039639 A1 | 2/2006 | Aoki et al. | |

FOREIGN PATENT DOCUMENTS

| | | | | |
|---|---|---|---|---|
| JP | 2008-164142 A | 7/2008 | | |
| JP | 2008-164143 A | 7/2008 | | |
| JP | WO 2008123065 A1 * | 10/2008 | | G01P 1/026 |
| JP | 2009-30712 A | 2/2009 | | |
| JP | 2009-36691 A | 2/2009 | | |
| JP | 2009-295058 A | 12/2009 | | |
| JP | WO 2011049020 A1 * | 4/2011 | | F16C 33/7886 |
| JP | 2012007707 A * | 1/2012 | | |
| JP | 2012-189101 A | 10/2012 | | |
| JP | 2013-60957 A | 4/2013 | | |
| SE | FR 2900209 A1 * | 10/2007 | | F16C 33/80 |

OTHER PUBLICATIONS

Japanese Office Action issued in counterpart Japanese Application No. 2013-106089 dated Feb. 25, 2014, with English translation (Five (5) pages).

Japanese language Written Opinion (PCT/ISA/237) issued in counterpart International Application No. PCT/JP2013/007298 dated Mar. 11, 2014 (Three (3) pages).

Decision to Grant a Patent issued in counterpart Japanese Application No. 2013-106089 dated Sep. 30, 2014, English translation only, (Three (3) pages).

International Search Report (PCT/ISA/210) issued in counterpart International Application No. PCT/JP2013/007298 dated Mar. 11, 2014, with English translation (Three (3) pages).

Extended European Search Report issued in counterpart European Application No. 13885248.8 dated Dec. 6, 2016 (ten (10) pages).

* cited by examiner

ROLLER BEARING HAVING SENSOR, MOTOR, AND ACTUATOR

TECHNICAL FIELD

The present invention relates to a rolling bearing having a sensor configured to measure a rotating state of a bearing ring, a motor, and an actuator, each having the rolling bearing.

BACKGROUND ART

In one technology, a rolling bearing having a sensor that measures the state of rotation (indicative of, for example, rotational speed, number of rotations, or rotating direction, hereinafter, also referred to as "rotating state") of the rotating ring is known. In a rolling bearing having such a sensor, as the sensor is attached at one end side in the axial direction of the rolling bearing, the other end side in the axial direction can be sealed by attaching seal, but one end side in the axial direction at which the sensor is attached has to be devised for sealing.

For example, Patent Literatures 1 and 2 each disclose a rolling bearing having a sensor, in which a mechanism of preventing the entering of foreign materials is arranged at one end side in the axial direction at which the sensor is attached to suppress the entering of the foreign materials into the sensor or the rolling bearing. This rolling bearing having the sensor includes an inner ring that is a rotating side bearing ring, an outer ring that is a fixed side bearing ring (non-rotating ring), rolling elements rotatably arranged between both rings, and a sensor that measures the rotating state of the bearing.

The sensor includes a detected object that rotates in an identical rotating state to the inner ring, a detecting body that detects the rotating state of the detected object, and a sensor housing that accommodates the detecting body. The detected object is fixed at the inner ring and rotates integrally with the inner ring, whereas the detecting body is fixed at the outer ring with being accommodated in the sensor housing to be capable of facing the detected object at a predefined space from the detected object. Then, the sensor housing includes the mechanism of preventing the entering of foreign materials from a gap between the inner ring and the sensor housing.

The rolling bearing having the sensor disclosed by Patent Literature 1 includes a foreign material entering prevention portion with a following configuration, as the mechanism of preventing the entering of foreign materials from the gap between the inner ring and the sensor housing. That is, the detected object is rotating together with the inner ring with being attached to a detected object holder fixed at the inner ring. The foreign material entering prevention portion is formed to protrude toward the detected object holder on a whole circumference of a facing surface, of the sensor housing, facing the detected object holder. Then, the sensor housing is located such that a protrusion end of the foreign material entering prevention portion faces the detected object holder at a predefined space therefrom, and a facing space between the protrusion end of the foreign material entering prevention portion and the detected object holder is set to be smaller than the facing space between the detected object and the detecting body.

In addition, the rolling bearing having the sensor disclosed by Patent Literature 2 includes a foreign material entering prevention portion with a following configuration, as the mechanism of preventing entering of foreign materials from the gap between the inner ring and the sensor housing. That is, the detected object is rotating together with the inner ring with being attached to a detected object holder fixed at the inner ring. The foreign material entering prevention portion is partially formed of an elastic material, one end side in the axial direction is fixed to the sensor housing, and a seal lip formed at the other end side is in sliding contact with the detected object holder or the inner ring side face.

CITATION LIST

Patent Literature

PLT 1: JP 2008-164143 A
PLT 2: JP 2008-164142 A

SUMMARY

Technical Problem

However, in the rolling bearing having the sensor disclosed by Patent Literature 1, since the facing space between the protrusion end of the foreign material entering prevention portion and the detected object holder is set to be smaller than the facing space between the detected object and the detecting body, the foreign material entering prevention portion might be brought into contact with the detected object holder. Therefore, there is a problem that the contact resistance is larger, and a smooth rotation of the rolling bearing having the sensor might be obstructed.

Besides, in the rolling bearing having the sensor disclosed by Patent Literature 2, as the seal lip is in sliding contact with the detected object holder or the inner ring side face. Therefore, the contact resistance is larger, and there is a problem that a smooth rotation of the rolling bearing having the sensor might be obstructed.

Therefore, the present invention solves the above problems of the prior art technologies as described above, and has an object to provide a rolling bearing having a sensor, a motor, and an actuator, in which any foreign materials hardly enter the inside of the bearing and the bearing is capable of smoothly rotating.

Solution to Problem

In order to address the above drawbacks, in one embodiment of the present invention, there is provided a rolling bearing having a sensor, including: a rotating ring configured to be rotatable; a fixed ring configured to rotatably support the rotating ring; a plurality of rolling elements rollably arranged between a raceway face of the rotating ring and a raceway face of the fixed ring; and a sensor configured to measure a rotating state of the rotating ring, wherein following conditions A, B, C, and D are satisfied.

condition A: the sensor includes: a detected object portion attached to the rotating ring to be rotatable integrally with the rotating ring; and a detecting portion attached to the fixed ring to face the detected object portion with a sensor gap, wherein the detecting portion is configured to measure the rotating state of the detected object portion in conjunction with a rotation of the rotating ring, condition B: the detecting portion is attached to the fixed ring via a sensor housing having a substantially ring shape configured to hold the detecting portion, and the sensor housing is attached at an end portion in an axial direction of the fixed ring.

condition C: a foreign material entering prevention portion configured to prevent a foreign material from entering the inside of the rolling bearing from a gap between the rotating ring and the sensor housing is arranged, and condition D: the foreign material entering prevention portion is non-contact seal configured by facing the rotating ring and the sensor housing each other via a gap, and a size of the gap is substantially identical to a size of the sensor gap.

In the above-described rolling bearing having the sensor, a protrusion configured to protrude toward an inner side of the rolling bearing in the axial direction may be arranged at the sensor housing, and the non-contact seal may be configured by facing the protrusion and the rotating ring each other via the gap.

In addition, in another embodiment of the present invention, there is provided a rolling bearing having a sensor, including: a rotating ring configured to be rotatable; a fixed ring configured to rotatably support the rotating ring; a plurality of rolling elements rollably arranged between a raceway face of the rotating ring and a raceway face of the fixed ring; and a sensor configured to measure a rotating state of the rotating ring, wherein following conditions E, F, G, and H are satisfied.

condition E: the sensor includes: a detected object portion attached to the rotating ring to be rotatable integrally with the rotating ring; and a detecting portion attached to the fixed ring to face the detected object portion with a sensor gap, wherein the detecting portion is configured to measure the rotating state of the detected object portion in conjunction with a rotation of the rotating ring, condition F: the detecting portion is attached to the fixed ring via a sensor housing having a substantially ring shape configured to hold the detecting portion, and the sensor housing is attached at an end portion in an axial direction of the fixed ring.

condition G: a foreign material entering prevention portion configured to prevent a foreign material from entering the inside of the rolling bearing from a gap between the rotating ring and the sensor housing is arranged, and condition H: an extension portion configured to extend in a radial direction along a side face of the rotating ring is arranged at the sensor housing, a plane configured to face the side face of the rotating ring is arranged at the extension portion, and the foreign material entering prevention portion is arranged at a gap extending in the radial direction between the plane and the side face of the rotating ring.

In the above-described rolling bearing having the sensor, a size of the gap between the plane and the side face of the rotating ring may be substantially identical to a size of the sensor gap. A face on an outer side of the rolling bearing in the axial direction of the extension portion may be an inclined face to be inclined toward an inner side of the rolling bearing in the axial direction, and the extension portion may be configured to be tapered toward a tip end in an extending direction.

Further, in yet another embodiment of the present invention, there is provided a rolling bearing having a sensor, including: a rotating ring configured to be rotatable; a fixed ring configured to rotatably support the rotating ring; a plurality of rolling elements rollably arranged between a raceway face of the rotating ring and a raceway face of the fixed ring; and a sensor configured to measure a rotating state of the rotating ring, wherein following conditions I, J, K, and L are satisfied.

condition I: the sensor includes: a detected object portion attached to the rotating ring to be rotatable integrally with the rotating ring; and a detecting portion attached to the fixed ring to face the detected object portion with a sensor gap, wherein the detecting portion is configured to measure the rotating state of the detected object portion in conjunction with a rotation of the rotating ring, condition J: the detecting portion is attached to the fixed ring via a sensor housing having a substantially ring shape configured to hold the detecting portion, and the sensor housing is attached at an end portion in an axial direction of the fixed ring, condition K: a foreign material entering prevention portion configured to prevent a foreign material from entering the inside of the rolling bearing from a gap between the rotating ring and the sensor housing, and condition L: the foreign material entering prevention portion is a magnet attached at a facing portion of the sensor housing facing the rotating ring.

Further, in yet another embodiment of the present invention, there is provided a motor including the above-described rolling bearing having the sensor.

Further, in yet another embodiment of the present invention, there is provided an actuator including the above-described motor.

Advantageous Effects

A rolling bearing having a sensor, a motor, and an actuator in the present invention each includes a foreign material entering prevention portion. Hence, any foreign materials hardly enter the inside of the bearing, and a rotating portion and a non-rotating portion are not in contact with each other at the foreign material entering prevention portion. Therefore, the bearing is capable of smoothly rotating.

DESCRIPTION OF EMBODIMENTS

Figure 1:
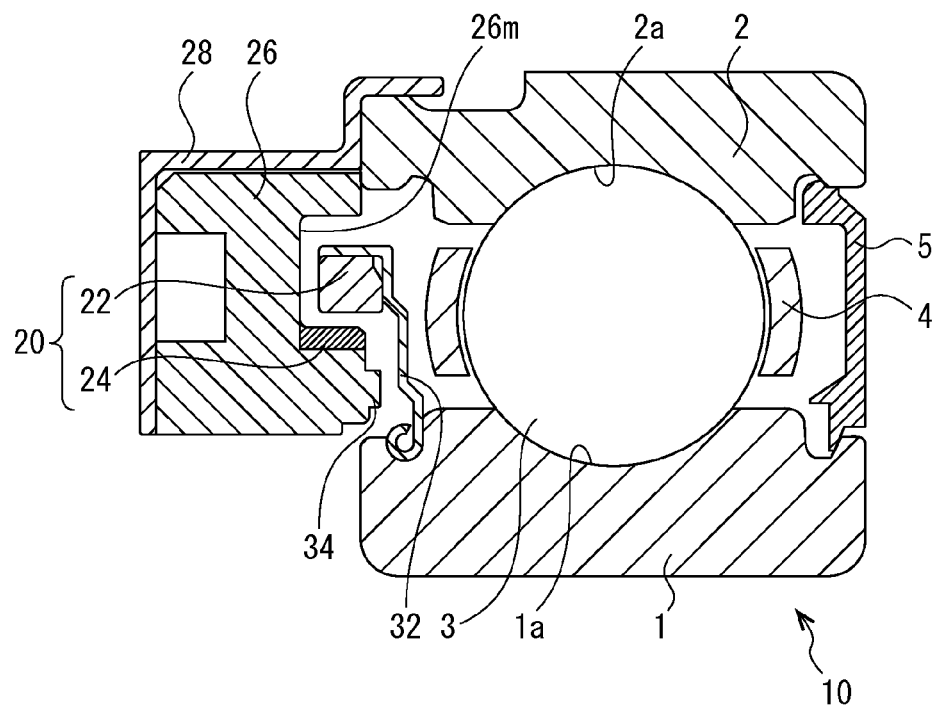
FIG. 1 is a longitudinal sectional view illustrative of a configuration of a deep groove ball bearing of a rolling bearing having a sensor in a first embodiment of the present invention.

Embodiments of a rolling bearing having a sensor, a motor, and an actuator in the present invention will be described with reference to the attached drawings in detail.
(First Embodiment)

A configuration of a deep groove ball bearing of the rolling bearing having the sensor in a first embodiment of the present invention will be described with reference to FIG. 1, in detail.

The deep groove ball bearing 10 in the first embodiment is configured to include an inner ring 1 having a raceway face 1a on an outer circumferential face, an outer ring 2 having a raceway face 2a opposed to the raceway face 1a on an inner circumferential face, plural rolling elements (balls) 3 rotatably arranged between both raceway faces 1a and 2a, and a holder 4 configured to hold the rolling elements 3 between the inner ring 1 and the outer ring 2. It is to be noted that the holder 4 is not necessarily provided. In addition, a lubricant (for example, lubricating oil or grease) may be sealed into a bearing internal space formed between the outer circumferential face of the inner ring 1 and the inner circumferential face of the outer ring 2.

In such a deep groove ball bearing 10, the inner circumferential face of the inner ring 1 is engaged with, for example, a rotating shaft (not illustrated), the inner ring 1 is configured to be a rotating ring capable of rotating. In addition, the outer circumferential face of the outer ring 2 is fixed at a bearing housing (not illustrated), for example, and the outer ring 2 is configured to be a fixed ring (in other words, non-rotating ring) that rotatably supports the inner ring 1 as the rotating ring. In other words, the deep groove ball bearing 10 is interposed between the rotating shaft and the bearing housing, and rotatably supports the rotating shaft with respect to the bearing housing. However, conversely, it is needless to say that the inner ring 1 may be configured to be the fixed ring and the outer ring 2 may be configured to be the rotating ring.

Then, a sealing device 5 configured to cover an opening of the gap between the inner ring 1 and the outer ring 2 (any of contact type or non-contact type is applicable, and a steel shield or a rubber seal is given as an example) is arranged at only one of the ends in the axial direction (in a direction of bearing center axis) of the deep groove ball bearing 10. At the other end in the axial direction of the deep groove ball bearing 10, a sensor 20 configured to measure the rotating state (for example, the rotational speed, the number of rotations, or the rotating direction) of the inner ring 1 that is a rotating ring is attached. It is to be noted that as to both ends in the axial direction of the deep groove ball bearing 10, one side where the sensor 20 is attached is also referred to as "sensor side", whereas the other side where the sensor 20 is not attached is also referred to as "sensor-opposite side".

Next, a configuration of the sensor 20 will be described. The sensor 20 is configured to include a detected object portion 22 attached to the inner ring 1 to be rotatable integrally with the inner ring 1 that is a rotating ring, a detecting portion 24 attached to the outer ring 2 that is a fixed ring to face the detected object portion 22 and have a sensor gap with the detected object portion 22. Then, the detecting portion 24 is configured to be capable of measuring the rotating state of the detected object portion 22 rotating with an identical rotating state to the inner ring 1 in conjunction with the rotation of the inner ring 1.

As the sensor 20, for example, a magnetic sensor detecting a change in the magnetic state (the strength and weakness or the direction of the magnetic field (specifically, a change in magnetic flux density), for example) or an optical sensor configured to detect a change in the state of a reflected light to the irradiated light can be arbitrarily selected and used. In the present embodiment, a case where the sensor 20 is a magnetic sensor will be described, as an example. Then, a ring-shaped magnet polarized in multi-polarity (hereinafter, also referred to as "encoder 22") is used as the detected object portion 22 of the magnetic sensor, and in addition, a magnetism detecting element (hereinafter, also referred to as "magnetism detecting element 24") configured to detect a change in the magnetic state (for example, a change in magnetic flux density) is used as the detecting portion 24. For the magnetism detecting element, for example, a Hall IC (Hall Integrated Circuit), a Hall device, an MR device (Magneto Resistive device), or a GMR device (Giant Magneto Resistive device) can be used.

It is to be noted that the number of the polarities magnetized to the encoder 22 may be set arbitrarily in accordance with the rotational speed of the inner ring 1 or the detection accuracy of the magnetism detecting element 24. For example, the encoder 22 can be configured to be a ring-shaped magnet having 100 polarities in total, on its inner circumferential face (magnetized face), including 50 N polarities and 50 S polarities are alternately magnetized at a constant pitch in a circumferential direction.

As the detected object portion 22, however, instead of the above-described encoder, for example, a gear (such as a gear-shaped magnetic substance), a pressed product in which a window is opened (such as a ring-shaped magnetic substance in which through holes are arranged at given intervals in a circumferential direction) may be used.

Further, a board (not illustrated) on which a predetermined circuit is wired is arranged at the sensor 20, which is configured such that the power is supplied to the magnetism detecting element 24 by the board from a power supply (not illustrated), and in addition, a signal (an electrical signal indicative of the rotating state of the encoder 22) output from the magnetism detecting element 24 is transmitted to a signal processor (not illustrated). In this case, the magnetism detecting element 24 or the signal processor may be connected to the board directly, or may be connected through a signal cable (not illustrated).

Furthermore, in the deep groove ball bearing 10 in the present embodiment, the encoder 22 is fixed to the inner ring 1 and rotates together with the inner ring 1. In the configuration illustrated in FIG. 1, as an example, the encoder 22 is fixed at an outer diameter portion of a magnet holder 32 (hereinafter, referred to as "encoder holder 32") by, for example, a commonly-used fixing means like bonding or welding, and the encoder holder 32 is attached to the inner ring 1, so that the encoder 22 is fixed to the inner ring 1.

It is to be noted that the encoder holder 32 has a ring shape, and its inner diameter portion is press-fit, caulked, and fixed into a groove arranged at an outer circumferential face of the inner ring 1, so as not to come into contact with the outer ring 2, the rolling elements 3, the holder 4, or the sensor housing 26, as will be described later. Accordingly, the encoder 22 is capable of rotating together with the inner ring 1 at an identical rotating state to the inner ring 1, with facing the magnetism detecting element 24, without being brought into contact with any one of the outer ring 2, the rolling elements 3, or the holder 4.

On the other hand, the magnetism detecting element 24 is configured to be held by the sensor housing 26 having a substantially ring shape with being connected with the board, so as to face the encoder 22 with a sensor gap in the radial direction. Then, by attaching the substantially ring-shaped sensor cover 28 accommodating the sensor housing 26 at an end portion in the axial direction (sensor side) of the outer ring 2, the magnetism detecting element 24 is fixed to the outer ring 2. The sensor cover 28 is configured such that its outer diameter portion is fixed at the outer ring 2, and when the deep groove ball bearing 10 is attached to the rotating shaft, a given gap is made between a tip of the inner diameter portion of the sensor cover 28 and the outer circumferential face of the rotating shaft. However, if the sensor housing 26 can be attached to the outer ring 2 directly, the deep groove ball bearing 10 does not necessarily include the sensor cover 28.

It is to be noted that in an example illustrated in FIG. 1, the magnetism detecting element 24 is located with respect to the encoder 22, such that an outer face in a radial direction of the magnetism detecting element 24 and the inner circumferential face (magnetized face) of the encoder 22 face each other with a sensor gap being spaced in the radial direction. However, the relative positional relationship of the magnetism detecting element 24 and the encoder 22 is not limited to the relative position illustrated in FIG. 1, as far as the element arrangement face of the magnetism detecting element 24 and the magnetized face of the encoder 22 face each other.

For example, an inner face in the radial direction of the magnetism detecting element 24 and the outer circumferential face of the encoder 22 may face each other, or an end face in the axial direction of the magnetism detecting element 24 and an end face in the axial direction of the encoder 22 may face each other. In these cases, the inner face in the radial direction or the end face in the axial direction of the magnetism detecting element 24, which is an opposed face to each other, may be configured as the element arrangement face, and in addition, the outer circumferential face or the end face in the axial direction of the encoder 22 may be configured as the magnetized face.

The sensor housing 26 is formed to have a ring shape in which its outer diameter is smaller in size than the outer diameter of the outer ring 2 and is larger in size than the inner diameter of the outer ring 2, and its inner diameter is smaller in size than the outer diameter of the inner ring 1 and is larger in size than the inner diameter of the inner ring 1. In addition, the sensor housing 26 is provided with a groove 26*m* (hereinafter, referred to as "encoder raceway groove 26*m*") having a depressed shape on the whole circumference at an end face in the axial direction to be in non-contact with the encoder 22 fixed at the inner ring 1 via the encoder holder 32.

It is to be noted that the length in the radial direction of the sensor housing 26 may be set so that the end face in the axial direction is in non-contact with the end face of the encoder 22, without the provision of the encoder raceway groove 26*m* at the sensor housing 26, or the sensor cover 28 at which the sensor housing 26 is fixed may be located with respect to the outer ring 2. As a method of fixing the sensor housing 26 and the sensor cover 28, any method such as fitting, adhering, bonding, welding, or fastening, for example may be used.

In addition, the sensor cover 28 is configured to have a ring shape such that its outer diameter is substantially same in size as that of the outer diameter of the outer ring 2, and its inner diameter is smaller in size than the outer diameter of the inner ring 1 and is larger in size than the inner diameter of the inner ring 1. Then, the sensor cover 28 is located with the outer diameter portion being fixed at the outer ring 2, so that a predetermined gap is made between a tip end of the inner diameter portion and the outer circumferential face of the rotating shaft of the deep groove ball bearing 10.

Herein, the number of the magnetism detecting elements 24 to be provided at the sensor 20 may be set arbitrarily depending on the application requested for the measurement of the rotating state of the deep groove ball bearing 10. In other words, the sensor 20 may have a configuration in which only one magnetism detecting element 24 measures the rotating state of the deep groove ball bearing 10, or may have a configuration in which two or more magnetism detecting elements 24 measure the rotating state of the deep groove ball bearing 10.

When two or more magnetism detecting elements 24 are arranged, the location in the circumferential direction may be considered. For example, when two magnetism detecting elements 24 are arranged in the sensor 20, such two magnetism detecting elements 24 are connected with the board to be located such that the electrical angles (in a case where a change in the magnetic flux density generated by a pair of S polarity and N polarity (that is, a pair including one S polarity and one N polarity) is 360 degrees) are displaced at 90 degrees (by providing a phase difference of 90 degrees), at a timing when such two magnetism detecting elements 24 detect a change in the magnetic state. Accordingly, it is possible to detect the rotating direction by comparing the detection results of magnetic changes at each magnetism detecting element 24, in consideration of the above phase difference, and it is possible to measure the rotating state of the deep groove ball bearing 10 (specifically, the inner ring 1 and the encoder 22) with more accuracy.

It is to be noted that in the above-described present embodiment, the materials of the sensor housing 26, the sensor cover 28 and the encoder holder 32 have not been described in particular, but any material depending on the use of the rolling bearing having the sensor may be selected.

By locating the encoder 22 and the magnetism detecting element 24 with respect to the inner ring 1 and the outer ring 2, the encoder 22 may be configured to rotate together with the inner ring 1, with the encoder 22 facing the magnetism detecting element 24, specifically, with the inner circumferential face (magnetized face) of the encoder 22 facing the outer face in the radial direction of the magnetism detecting element 24 (element arrangement face).

In other words, in the deep groove ball bearing 10, when the inner ring 1 rotates, the encoder 22 rotates in conjunction with this, and the locations of the magnetic polarities (N polarity and S polarity) with respect to the magnetism detecting element 24 change alternately in succession. In this situation, the magnetic flux (more specifically, the density of the magnetic flux) that passes through the magnetism detecting element 24 continuously changes and such a change is detected by the magnetism detecting element 24, so that information on the location or angle of the encoder 22 can be obtained.

Then, a change in the magnetic flux density detected by the magnetism detecting element 24 is converted into an electrical signal with a board, and in addition, the electrical signal (data) is transmitted to a signal processor (not illustrated). In the signal processor, operation processing is carried out for a change amount of the location or angle of the encoder 22 per unit time. Accordingly, it is made possible to measure the rotating state of the deep groove ball bearing 10 (to be specific, the inner ring 1 fixed with the encoder 22).

It is to be noted that in this case, the board (magnetism detecting element 24) of the sensor 20 and the signal processor is connected by a signal cable, not illustrated, and the above-described electrical signal is transmitted (output) through the signal cable to the signal processor.

At the deep groove ball bearing 10 as described above in the present embodiment, as illustrated in FIG. 1, there is provided a foreign material entering prevention portion configured to prevent foreign materials such as iron powders, iron pieces, dusts, or the like from entering the inside of the bearing from a gap between the inner ring 1 and the sensor housing 26. When a foreign material enters the inside of the bearing, the rotation of the deep groove ball bearing 10 might have a problem. In addition, when a foreign material enters the inside of the bearing and such a foreign material enters a facing part of the encoder 22 that is a detected object portion and the magnetism detecting element 24 that is a detecting portion, to be specific, when a foreign material enters a facing part of an inner circumferential face (magnetized face) of the encoder 22 and an outer face in the radial direction of the magnetism detecting element 24 (element arrangement face), the measurement of the rotating state of the inner ring 1 by using the sensor 20 might have a problem.

Here, the foreign material entering prevention portion will be described below. As illustrated in FIG. 1, a corner portion formed on the outer circumferential side of an end portion in the axial direction of the inner ring 1 and a corner portion formed on the inner side of the bearing in the axial direction of an inner end portion in the radial direction of the sensor housing 26 face each other with a gap. The size of this gap is substantially identical to a sensor gap between the magnetism detecting element 24 and the encoder 22, in consideration of tolerances of parts or clearances of the deep groove ball bearing 10. The gap between the inner ring 1 and the sensor housing 26 is small and is configured to be non-contact seal, and thus functions as the foreign material entering prevention portion.

In the deep groove ball bearing 10 in the present embodiment, the sensor-opposite side is sealed by the sealing device 5, whereas the sensor side is sealed by the foreign material entering prevention portion. Therefore, any foreign materials such as iron powders, iron pieces, dusts, or the like are prevented from entering the inside of the sensor 20. Since any foreign particles such as dusts are suppressed from reaching the inside of the deep groove ball bearing 10, a problem may hardly occur at the rotation of the deep groove ball bearing 10 and the bearing performance of the deep groove ball bearing 10 is maintained for a long term.

Also, since any magnetic substances such as iron powders or iron pieces are suppressed from reaching the encoder 22 or the magnetism detecting element 24, a problem may hardly occur at the measurement of the rotating state of the inner ring 1 by using the sensor 20 and the rotating state of the inner ring 1 can be measured with high accuracy by using the sensor 20 for a long term.

In addition, when the size of the gap between the inner ring 1 and the sensor housing 26 is smaller than the sensor gap between the magnetism detecting element 24 and the encoder 22, the inner ring 1 and the sensor housing 26 might be brought into contact with each other, and a contact resistance becomes larger and a problem might occur at a smooth rotation of the deep groove ball bearing 10. However, in the present embodiment, since the size of the gap between the inner ring 1 and the sensor housing 26 is substantially identical to the sensor gap between the magnetism detecting element 24 and the encoder 22, the inner ring 1 and the sensor housing 26 is hardly brought into contact with each other. Therefore, since the deep groove ball bearing 10 is sealed without the inner ring 1 and the sensor housing 26 coming in contact with each other, the deep groove ball bearing 10 is capable of rotating smoothly.

There is no particular limitation to the means configured to make the gap between the inner ring 1 and the sensor housing 26 smaller enough to be substantially identical to the sensor gap between the magnetism detecting element 24 and the encoder 22. As illustrated in FIG. 1, however, the means configured to provide a protrusion 34 at the sensor housing 26 may be used. In other words, the protrusion 34 having a cylindrical shape, for example, that protrudes toward the inner side of the bearing in the axial direction is arranged at an end face in the axial direction (a face opposite to the deep groove ball bearing 10) of the sensor housing 26, so that a side face of the protrusion 34 and the outer circumferential face of the inner ring 1 are made to face each other via a gap in the radial direction. Then, the size of the gap in the radial direction is set to be substantially identical to the size of the sensor gap.

The end face in the axial direction of the sensor housing 26 faces the encoder holder 32, but to prevent the contact resistance from becoming larger when the sensor housing 26 and the encoder holder 32 come into contact with each other, the end face in the axial direction of the sensor housing 26 is formed to have a protrusion shape (that is, the protrusion 34 is provided), so that the size of the gap between the inner ring 1 and the sensor housing 26 may be adjusted as described above, in one embodiment. The protrusion 34, when coming into contact with the encoder holder 32, the contact area is small and the contact resistance is suppressed from becoming larger.

(Second Embodiment)

The structure of the deep groove ball bearing of the rolling bearing having a rotation sensor in a second embodiment of the present invention will be described in detail, with reference to FIG. 2. It is to be noted that the configuration and advantages of the deep groove ball bearing 10 in the second embodiment are almost same with those in the first embodiment. Only different parts will be described, but the descriptions of similar parts will be omitted. Also, in FIG. 2, identical or corresponding parts to those in FIG. 1 have the identical numerals to those in FIG. 1.

Figure 2:
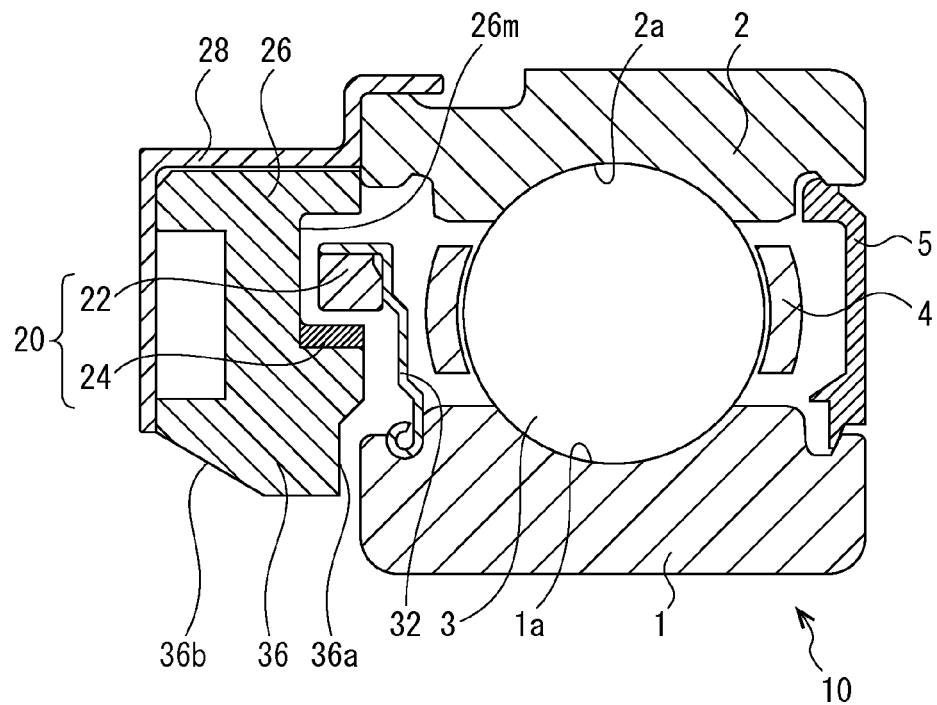
FIG. 2 is a longitudinal sectional view illustrative of a configuration of a deep groove ball bearing of a rolling bearing having a sensor in a second embodiment of the present invention.

At the deep groove ball bearing 10, in the second embodiment, as illustrated in FIG. 2, there is provided a foreign material entering prevention portion configured to prevent foreign materials such as iron powders, iron pieces, dusts, or the like from entering the inside of the bearing from a gap between the inner ring 1 and the sensor housing 26. Here, the foreign material entering prevention portion in the second embodiment will be described below.

In the first embodiment, the inner end portion in the radial direction of the sensor housing 26 is located near the radial location of the outer circumferential face of the inner ring 1, whereas in the second embodiment, the inner end portion in the radial direction of the sensor housing 26 is located at a substantially middle position in the radial direction between the inner circumferential face and the outer circumferential face of the inner ring 1.

In other words, as illustrated in FIG. 2, an extension portion 36 extending inward in the radial direction along the side face of the inner ring 1 is arranged at the sensor housing 26, and thus, the inner end portion in the radial direction of the sensor housing 26 is located at a substantially middle position in the radial direction between the inner circumferential face and the outer circumferential face of the inner ring 1. It is to be noted that the extension portion 36 may extend inward in the radial direction, so that the inner end portion in the radial direction of the sensor housing 26 is located near the radial location of the inner circumferential face of the inner ring 1.

A plane 36a facing the side face of the inner ring 1 is formed at the extension portion 36. As the plane 36a and the side face of the inner ring 1 face each other via a gap extending long in the radial direction, a path from the outside of the bearing to the inside of the bearing is long. Therefore, since the gap between the plane 36a and the side face of the inner ring 1 is configured to be non-contact seal, and functions as the foreign material entering prevention portion.

It is to be noted that the size of the gap between the plane 36a and the side face of the inner ring 1 may be substantially identical to the sensor gap between the magnetism detection element 24 and the encoder 22 in consideration of tolerances of parts or clearances of the deep groove ball bearing 10. Accordingly, the gap between the plane 36a and the side face of the inner ring 1 is small, and thus the sealing performance is further improved.

In the deep groove ball bearing 10 in the second embodiment, the sensor-opposite side is sealed by the sealing device 5, and in addition, the sensor side is sealed by the foreign material entering prevention portion. Therefore, any foreign materials such as iron powders, iron pieces, dusts, or the like are prevented from entering the inside of the sensor 20. Since any foreign particles such as dusts are suppressed from reaching the inside of the deep groove ball bearing 10, a problem may hardly occur at the rotation of the deep groove ball bearing 10 and the bearing performance of the deep groove ball bearing 10 is maintained for a long term.

Also, since any magnetic substances such as iron powders or iron pieces are suppressed from reaching the encoder 22 or the magnetism detection element 24, a problem may hardly occur at the measurement of the rotating state of the inner ring 1 by using the sensor 20, and the rotating state of the inner ring 1 can be measured with high accuracy by using the sensor 20 for a long term. Further, since the deep groove ball bearing 10 is sealed without the inner ring 1 and the sensor housing 26 coming into contact with each other, the deep groove ball bearing 10 is capable of rotating smoothly.

Furthermore, as illustrated in FIG. 2, a face on the outer side of the bearing in the axial direction of the extension portion 36 is formed as an inclined face 36*b* to be inclined toward the inner side of the bearing in the axial direction, so that the extension portion 36 may be formed to be tapered inward in the radial direction (toward the tip end in the extending direction of the extension portion 36), in one embodiment. In such a case, when the sensor housing 26 is attached to the outer ring 2 to assemble the deep groove ball bearing 10, an impact for the inner side of the bearing in the axial direction to be given to the sensor housing 26 is burdened by the inclined face 36*b*, and thus the impact to be given to the sensor housing 26 can be relieved.

(Third Embodiment)

The structure of the deep groove ball bearing of the rolling bearing having a rotation sensor in a third embodiment of the present invention will be described in detail with reference to FIG. 3. It is to be noted that the configuration and advantages of the deep groove ball bearing 10 in the third embodiment are almost same with those in the first embodiment. Only different parts will be described, but the descriptions of similar parts will be omitted. Also, in FIG. 3, identical or corresponding parts to those in FIG. 1 have the identical numerals to those in FIG. 1.

Figure 3:
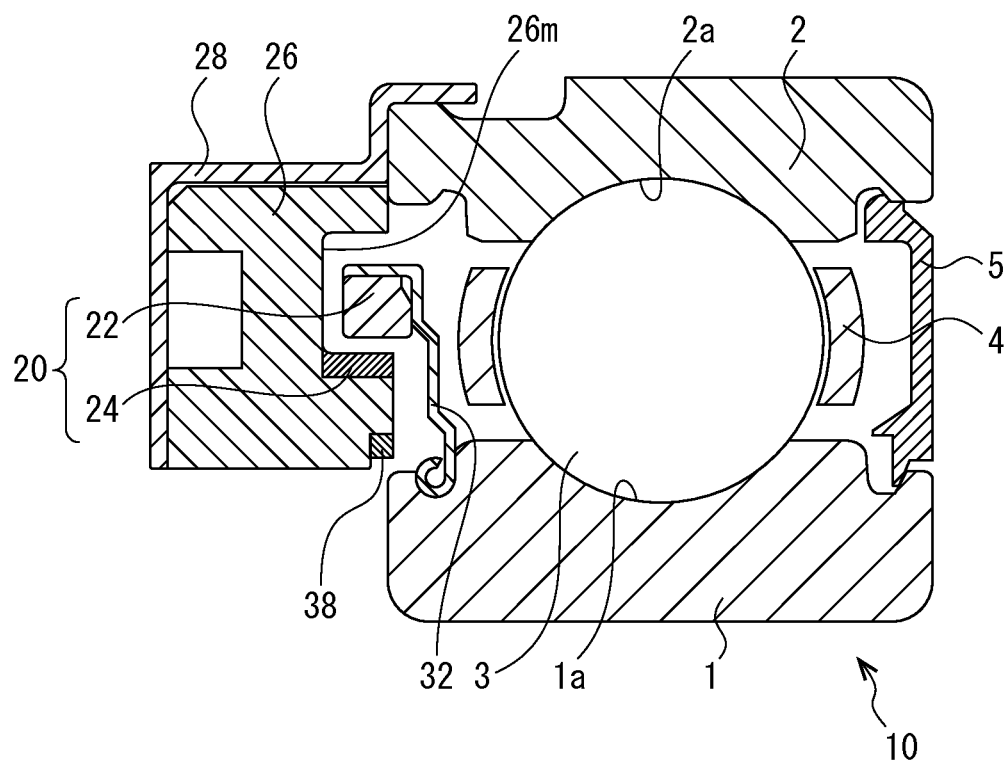
FIG. 3 is a longitudinal sectional view illustrative of a configuration of a deep groove ball bearing of a rolling bearing having a sensor in a third embodiment of the present invention.

In the deep groove ball bearing 10, in the third embodiment, as illustrated in FIG. 3, there is provided a foreign material entering prevention portion configured to prevent foreign materials such as iron powders, iron pieces, dusts, or the like from entering the inside of the bearing from a gap between the inner ring 1 and the sensor housing 26. Here, the foreign material entering prevention portion in the third embodiment will be described below.

As illustrated in FIG. 3, a corner portion arranged on the outer circumferential face side of the end portion in the axial direction of the inner ring 1 and a corner portion formed on the inner side of the bearing in the axial direction of the inner end portion in the radial direction of the sensor housing 26 face each other with a gap. A magnet 38 is attached at the corner portion of the sensor housing 26 facing the inner ring 1. This magnet 38 is configured to adsorb any magnetic foreign materials such as iron powders, iron pieces, or the like, and to prevent any magnetic foreign materials such as iron powders, iron pieces, or the like from entering the inside of the bearing from the gap between the inner ring 1 and the sensor housing 26, and is configured to function as the foreign material entering prevention portion.

The method of attaching the magnet 38 to the corner portion of the sensor housing 26 is not limited, in particular. For example, a molding magnet may be attached to the corner portion of the sensor housing 26 by a commonly-used adhesion means such as bonding or the like, or the molding magnet may be molded integrally with the sensor housing 26. However, it is necessary to set the magnetic flux density of the magnet 38 appropriately not to affect the output of the sensor 20.

In the deep groove ball bearing 10 in the third embodiment, the sensor-opposite side is sealed by the sealing device 5, and in addition, the sensor side is sealed by the foreign material entering prevention portion. Therefore, any foreign materials such as iron powders, iron pieces, dusts, or the like are prevented from entering the inside of the sensor 20. Since any foreign particles such as dusts are suppressed from reaching the inside of the deep groove ball bearing 10, a problem may hardly occur at the rotation of the deep groove ball bearing 10 and the bearing performance of the deep groove ball bearing 10 is maintained for a long term.

Also, since any magnetic substances such as iron powders or iron pieces are suppressed from reaching the encoder 22 or the magnetism detection element 24, a problem may hardly occur at the measurement of the rotating state of the inner ring 1 by using the sensor 20, and the rotating state of the inner ring 1 can be measured with high accuracy by using the sensor 20 for a long term. Further, since the deep groove ball bearing 10 is sealed without the inner ring 1 and the sensor housing 26 coming into contact with each other, the deep groove ball bearing 10 is capable of rotating smoothly.

It is to be noted that the first, second, and third embodiments as described above are examples of the present invention. The present invention is not limited to the first, second, or third embodiment. In the first, second, and third embodiments, for example, the deep groove ball bearing has been described as an example of the rolling bearing. However, the present invention is applicable to various rolling bearings of other kinds. Examples are given as radial shaped rolling bearings including angular contact ball bearing, self-aligning ball bearing, self-aligning roller bearing, cylindrical roller bearing, tapered roller bearing, needle roller bearing, and the like, and thrust shaped rolling bearings including thrust ball bearing, thrust roller bearing, and the like.

In addition, the foreign material entering prevention portions in the first, second, and third embodiments, as illustrated in FIG. 1 to FIG. 3, are solely applicable to the deep groove ball bearing 10, respectively. However, two or three types of the foreign material entering prevention portions are applicable to the deep groove ball bearing 10. For example, the foreign material entering prevention portions in the first and second embodiments are combined, and an extension portion extending inward in the radial direction along the side face of the inner ring 1 may be arranged at the sensor housing 26 of FIG. 1.

In addition, the foreign material entering prevention portions in the first and third embodiments are combined, and a magnet adsorbing the magnetic foreign materials such as iron powders, iron pieces, and the like may be attached at the root part of the protrusion 34 of the sensor housing 26 of FIG. 1. Furthermore, the foreign material entering prevention portions in the second and third embodiments are combined, and a magnet adsorbing the magnetic foreign materials such as iron powders, iron pieces, and the like may be attached at any part on the plane 36*a* of the sensor housing 26 of FIG. 2.

Moreover, the deep groove ball bearing 10 in the first, second, or third embodiment form may be incorporated into a motor. The deep groove ball bearing 10 is arranged between the fixed side of the motor and the rotation shaft, so as to be used to detect the rotating speed of the rotation shaft, the rotating angle, and the like. The motor including the rolling bearing having such a sensor can be used as a motor used for driving a vehicle such as an electric fork lift, a motor generating the assist torque of the electric power steering device of the vehicle, or a direct drive motor to move and position the operated object at an arbitrary angle.

In addition, such a motor can be incorporated to configure an actuator. For example, the actuator can be configured such that a ball screw is coupled with the rotation shaft of the motor and the rotation by the motor is converted into a direct motion, so as to move and locate the operated object in a linear direction. Further, the electric power steering device including the motor and the above-described direct drive motor are actuators, too. Even in a motor, as any foreign materials generated by the dusts entering from the outside, wearing due to rotations, or the like can be considered, the configuration in one embodiment of the present invention is useful.

REFERENCE SIGNS LIST 1 inner ring
1a raceway face
2 outer ring
2a raceway face
3 rolling element
10 deep groove ball bearing
20 sensor
22 encoder
24 magnetism detection element
26 sensor housing
28 sensor cover
32 encoder holder
34 protrusion portion
36 extension portion
36a plane
36b inclined face
38 magnet

The invention claimed is:
1. A rolling bearing having a sensor, comprising:
a rotating ring configured to be rotatable;
a fixed ring configured to rotatably support the rotating ring;
a plurality of rolling elements rollably arranged between a raceway face of the rotating ring and a raceway face of the fixed ring; and
a sensor configured to measure a rotating state of the rotating ring,
wherein following conditions A, B, C, D, and M are satisfied,
condition A:
the sensor comprises:
a detected object portion attached to the rotating ring to be rotatable integrally with the rotating ring; and
a detecting portion attached to the fixed ring to face the detected object portion with a sensor gap, wherein
the detecting portion is configured to measure the rotating state of the detected object portion in conjunction with a rotation of the rotating ring,
condition B:
the detecting portion is attached to the fixed ring via a sensor housing having a substantially ring shape configured to hold the detecting portion, and
the sensor housing is attached at an end portion in an axial direction of the fixed ring,
condition C:
a foreign material entering prevention portion configured to prevent a foreign material from entering the inside of the rolling bearing from a gap between the rotating ring and the sensor housing is arranged,
condition D:
the foreign material entering prevention portion is non-contact seal configured by the rotating ring and the sensor housing facing each other via the gap between the rotating ring and the sensor housing, and
a size of the gap between the rotating ring and the sensor housing is substantially identical to a size of the sensor gap, and
condition M:
a protrusion configured to protrude toward an inner side of the rolling bearing in the axial direction is arranged at an end face of the sensor housing in the axial direction, and the non-contact seal is configured by a side face of the protrusion and an outer circumferential face of the rotating ring facing each other via the gap between the rotating ring and the sensor housing in a radial direction.

2. A motor comprising the rolling bearing having the sensor according to claim 1.

3. An actuator comprising the motor according to claim 2.

4. A rolling bearing having a sensor, comprising:
a rotating ring configured to be rotatable;
a fixed ring configured to rotatably support the rotating ring;
a plurality of rolling elements rollably arranged between a raceway face of the rotating ring and a raceway face of the fixed ring; and
a sensor configured to measure a rotating state of the rotating ring,
wherein following conditions E, F, G, H, N, and O are satisfied,
condition E:
the sensor comprises:
a detected object portion attached to the rotating ring to be rotatable integrally with the rotating ring; and
a detecting portion attached to the fixed ring to face the detected object portion with a sensor gap, wherein
the detecting portion is configured to measure the rotating state of the detected object portion in conjunction with a rotation of the rotating ring,
condition F:
the detecting portion is attached to the fixed ring via a sensor housing having a substantially ring shape configured to hold the detecting portion, and
the sensor housing is attached at an end portion in an axial direction of the fixed ring,
condition G:
a foreign material entering prevention portion configured to prevent a foreign material from entering the inside of the rolling bearing from a gap between the rotating ring and the sensor housing is arranged,
condition H:
an extension portion configured to extend in a radial direction along a side face of the rotating ring is arranged at the sensor housing,
a plane configured to face the side face of the rotating ring is arranged at the extension portion, and the foreign material entering prevention portion is arranged at a gap extending in the radial direction between the plane and the side face of the rotating ring, condition N:

a size of the gap between the plane and the side face of the rotating ring is substantially identical to a size of the sensor gap, and condition O:

a face on an outer side of the rolling bearing in the axial direction of the extension portion is an inclined face to be inclined toward an inner side of the rolling bearing in the axial direction, and the extension portion is configured to be tapered toward a tip end in an extending direction.

5. A rolling bearing having a sensor, comprising:

a rotating ring configured to be rotatable;

a fixed ring configured to rotatably support the rotating ring;

a plurality of rolling elements rollably arranged between a raceway face of the rotating ring and a raceway face of the fixed ring; and a sensor configured to measure a rotating state of the rotating ring, wherein following conditions I, J, K, L, and P are satisfied, condition I:

the sensor comprises:

a detected object portion attached to the rotating ring to be rotatable integrally with the rotating ring; and a detecting portion attached to the fixed ring to face the detected object portion with a sensor gap, wherein the detecting portion is configured to measure the rotating state of the detected object portion in conjunction with a rotation of the rotating ring, condition J:

the detecting portion is attached to the fixed ring via a sensor housing having a substantially ring shape configured to hold the detecting portion, and the sensor housing is attached at an end portion in an axial direction of the fixed ring, condition K:

a foreign material entering prevention portion configured to prevent a foreign material from entering the inside of the rolling bearing from a gap between the rotating ring and the sensor housing, condition L:

the foreign material entering prevention portion is a magnet attached at a facing portion of the sensor housing facing the rotating ring, and condition P:

a corner portion arranged on an outer circumferential face side of an end portion in the axial direction of the rotating ring and a corner portion formed on an inner side of the rolling bearing in the axial direction of an inner end portion in a radial direction of the sensor housing face each other with the gap, and the magnet is attached at the corner portion of the sensor housing facing the inner ring.

* * * * *